(12) United States Patent
Broman et al.

(10) Patent No.: US 8,038,493 B1
(45) Date of Patent: Oct. 18, 2011

(54) EXHAUST SYSTEM WITH A CATALYST FOR A MARINE PROPULSION DEVICE

(75) Inventors: Jeffrey J. Broman, Slinger, WI (US); Steven W. Habeck, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 246 days.

(21) Appl. No.: 12/423,260

(22) Filed: Apr. 14, 2009

(51) Int. Cl.
- *B63H 21/32* (2006.01)
- *F01N 3/04* (2006.01)
- *F01N 3/28* (2006.01)
- *F01N 13/00* (2006.01)
- *F01P 3/20* (2006.01)
- *F28F 9/04* (2006.01)

(52) U.S. Cl. ................. 440/89 B; 440/89 H; 440/88 HE (58) Field of Classification Search ................. 440/88 R, 440/88 D, 88 G, 88 J, 88 M, 88 HE, 88 P, 440/88 C, 89 R, 89 B, 89 C; 60/302, 321, 60/323

See application file for complete search history.

(56) References Cited

U.S. PATENT DOCUMENTS

| | | | |
|---|---|---|---|
| 4,772,236 A | 9/1988 | Takahashi | |
| 5,378,180 A | 1/1995 | Nakayama et al. | |
| 5,556,311 A | 9/1996 | Fujimoto | |
| 5,822,985 A * | 10/1998 | Yoshimura | 60/302 |
| 5,911,610 A | 6/1999 | Fujimoto | |
| 6,632,110 B2 | 10/2003 | Kato | |
| 6,662,555 B1 | 12/2003 | Ishii | |
| 7,047,732 B2 * | 5/2006 | Miyashita et al. | 60/323 |
| 7,216,638 B1 | 5/2007 | Burk et al. | |
| 2008/0166935 A1 | 7/2008 | Ito et al. | |

* cited by examiner

*Primary Examiner* — Daniel Venne
(74) *Attorney, Agent, or Firm* — William D. Lanyi (57) ABSTRACT

A catalyzed exhaust system for an outboard motor engine rotates its catalyst device in a catalyst housing above an adapter plate which supports the engine and separates it from the driveshaft housing. The exhaust gas is directed initially in an upwardly direction and then is turned downwardly to provide space for location and easy access to the catalyst device. A coolant, such as water drawn from a body of water, is reversed in direction of flow several times in order to advantageously fill certain cooling channels in an upward direction. In addition, various coolant channels are vented to remove potential pockets of air in their upper regions.

20 Claims, 4 Drawing Sheets

EXHAUST SYSTEM WITH A CATALYST FOR A MARINE PROPULSION DEVICE

BACKGROUND OF THE INVENTION

1. Field of the Invention

The present invention is generally related to a marine propulsion device and, more particularly, to an outboard motor with a catalyzed exhaust system.

2. Description of the Related Art

Those skilled in the art of marine propulsion devices are familiar with many different types of structures and systems provided to direct the flow of exhaust gas from the engine of the marine propulsion device, such as an outboard motor. In addition, those familiar with marine engines are aware of many different types of engine cooling systems which direct a coolant, such as water, to flow in thermal communication with portions of the engine and its components that receive heat from the internal combustion process. Those familiar with marine propulsion devices are also aware of many different arrangements for catalyzing the exhaust from marine engines.

U.S. Pat. No. 4,772,236, which issued to Takahashi on Sep. 20, 1988, describes an exhaust gas purifying device for a marine engine. An outboard motor with an improved catalyst system for treating the exhaust gases regardless of whether they are delivered to the atmosphere through an above the water exhaust gas discharge or a below the water exhaust gas discharge is described.

U.S. Pat. No. 5,378,180, which issued to Nakayama et al. on Jan. 3, 1995, describes an exhaust system for an outboard motor. A catalyst is positioned in the exhaust system downstream of the point where the exhaust pipe terminates in the expansion chamber so as to preclude interference with the exhaust timing. The catalyst bed is removable for ease of servicing without necessitating removal of the outboard motor from the attachment to the associated water path and a trap device is provided for precluding water from entering the engine through its exhaust port.

U.S. Pat. No. 5,556,311, which issued to Fujimoto on Sep. 17, 1996, describes an outboard motor exhaust cooling system. A catalytic exhaust system for an outboard motor is described wherein the catalyst is positioned in the driveshaft housing to remove the force of heat from the powerhead. However, the catalyst is contained within a field compartment in the driveshaft housing lower unit. In order to protect the catalyst from water, a trap section is positioned in the powerhead and this is water cooled by a source of water which has not passed through the engine for its cooling prior to delivery to the trap section.

U.S. Pat. No. 5,911,610, which issued to Fujimoto on Jun. 15, 1999, describes an outboard motor exhaust system. A catalytic exhaust system for an is outboard motor having an engine positioned in a cowling is described. The exhaust system leads from an exhaust port of the engine to a discharge from the motor. A catalyst is positioned in the exhaust system for catalyzing exhaust gases. A first port is positioned in the exhaust system downstream of the catalyst through which an exhaust gas probe may be selectively extended for obtaining an exhaust gas sample.

U.S. Pat. No. 6,632,110, which issued to Kato on Oct. 14, 2003, describes an exhaust catalyst for an outboard motor engine. The catalyst assembly for an outboard motor includes a branched passage connecting the main exhaust passages with a catalyst device. The outboard motor can include various exhaust passages and features for controlling and discharging the flow to and from the catalyst device.

U.S. Pat. No. 6,662,555, which issued to Ishii on Dec. 16, 2003, describes a catalyzer arrangement for an engine. It includes an improved construction that does not require a large space for furnishing a relatively large volume catalyzer. The engine is surrounded by a protective cowling. A cylinder body of the engine has a plurality of cylinder bores spaced apart from each other. The engine also has an exhaust manifold to gather exhaust gases from the respective cylinder bores. An exhaust passage is coupled to the manifold and extends, at least in part, within a space defined between a side surface of the cylinder body and the protective cowling. At least one catalyzer is disposed in the exhaust passage.

U.S. Pat. No. 7,216,638, which issued to Burk et al. on May 15, 2007, discloses a control of exhaust gas stoichiometry with inducted secondary air flow. A method for operating a marine engine uses four valves to control the flow of secondary air that is inducted into each of the cylinders of an engine. An oxygen sensor is disposed in an exhaust passage downstream from the cylinders and upstream from a catalytic converter. A carburetor is calibrated to provide a richer than stoichiometric air/fuel ratio so that inducted secondary air through the valve associated with each cylinder can result in a stoichiometric ratio of air flowing into each cylinder. The cylinders are each provided with their own valve in order to allow the air/fuel ratios to be equalized for each cylinder regardless of the configuration and geometry of the intake manifold and its associated circuits.

U.S. patent application Ser. No. 11/966,699, which was filed on Dec. 28, 2007 by Ito et al., describes an exhaust system for an outboard motor. An outboard motor includes a multi-cylinder engine which includes cylinders longitudinally oriented and vertically parallel in a cylinder block, a cylinder head arranged at a rearward position of the cylinder block, and a crank case arranged at a forward position of the cylinder block, the cylinder head having an outlet of an exhaust port at one side thereof. An exhaust system for the outboard motor includes an exhaust manifold which communicates the outlet of the exhaust port with an exhaust outlet opening, the exhaust manifold including a first exhaust gas passage extending in a vertical direction for gathering exhaust gas discharged from the outlet of each exhaust port and a second exhaust gas passage extending in a vertical direction adjacently to the first exhaust gas passage, and a catalyst unit is provided on the way of the second exhaust gas passage.

The patents described above are hereby expressly incorporated by reference in the description of the present invention.

SUMMARY OF THE INVENTION

A marine propulsion device made in accordance with a preferred embodiment of the present invention comprises an engine which, in turn, comprises a cylinder block and a head, a plurality of cylinders formed within the cylinder block, a plurality of combustion chambers formed within the head, an exhaust manifold, a plurality of exhaust conduits connected in fluid communication between the plurality of combustion chambers and the exhaust manifold, a catalyst housing, an exhaust passage, and first, second, third, and fourth channels used to conduct a coolant in thermal communication with various portions of the marine propulsion device. In a preferred embodiment of the present invention, each of the combustion chambers is disposed proximate an associated one of the plurality of cylinders and the plurality of exhaust conduits direct the flow of exhaust gas from the plurality of combustion chambers to the exhaust manifold. The catalyst housing is configured to direct the flow of exhaust gas through a catalyst device and the exhaust passage is connected in fluid communication between the exhaust manifold and the catalyst housing.

In a particularly preferred embodiment of the present invention, a first vertical centerline of the exhaust manifold is displaced from a second vertical centerline of the catalyst device by between 1.3 and 1.5 times the diameter of the catalyst device. In a preferred embodiment of the present invention, a first vent opening is connected in fluid communication with a third channel which, in turn, is configured to direct coolant downwardly and in thermal communication with the exhaust passage. In a particularly preferred embodiment of the present invention, the coolant is water and the marine propulsion device further comprises a pump for drawing the water from a body of water in which the marine propulsion device is operated. In certain embodiments of the present invention, a fifth coolant channel is configured to direct the coolant, such as water, upwardly within the cylinder block of the engine and in thermal communication with the plurality of cylinders. A sixth coolant channel is configured to direct the water upwardly from the pump and in thermal communication with a plurality of combustion chambers. A second vent, in certain embodiments of the present invention, connects the sixth coolant channel in fluid communication with ambient pressure.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Those skilled in the art of outboard motor design are familiar with many problems associated with the incorporation of a catalyst with the marine engine of an outboard motor. Increasingly stringent requirements regarding exhaust gas emissions, along with related governmental regulations, necessitate a design that efficiently packages the components associated with a catalyst and the systems that are necessary to provide temperature management of the catalyst and other engine components. A preferred embodiment of the present invention is intended to solve these complex packaging problems in a way that also protects the catalyst from contact with water and manages its relatively high temperature. The patents described above are intended to be representative of the numerous patents which address various characteristics of outboard motors with catalysts. Many of these designs locate the catalyst below the powerhead and in the driveshaft housing. Some arrangements route the exhaust gas downwardly to the driveshaft housing in a conventional manner and then back up to the catalyst housing before again returning the exhaust gas flow downwardly into the driveshaft housing and, eventually, through the propeller hub of the outboard motor. Some known outboard motor designs integrate the catalyst into the structure of the powerhead. The exhaust gas is routed from the cylinders of the engine, through the catalyst, and then downwardly into the driveshaft housing and the propeller hub. In some known outboard engine designs, the exhaust system is incorporated into the castings of the engine block and head. Some applications use exhaust manifolds that are bolted onto the head of the engine to transfer exhaust gases downwardly and through an adapter plate or an exhaust pipe.

A preferred embodiment of the present invention, as will be described herein, utilizes an exhaust manifold that bolts onto the engine, but also routes the exhaust gas out of the cylinder head into the exhaust manifold, through a catalytic converter, and into the cylinder block before it passes through the adapter plate and downwardly through the remaining portion of the lower exhaust system. One of the functions of a preferred embodiment of the present invention is to allow the packaging of the catalytic converter at a location which is removed from the water that is present in the exhaust system during both the static and running modes of operation of the outboard engine. The exhaust system, in a preferred embodiment of the present invention, uses a separate exhaust manifold that routes the exhaust gas first upwardly and then downwardly for the purpose of providing sufficient vertical space for the catalytic converter. A particularly preferred embodiment of the present invention uses a two-piece design that bolts directly to the cylinder head. A bolted joint attaches the upper and lower manifold sections, with the lower manifold section fitting into a receiving element in the cylinder block. Some relative motion is accommodated by the use of O-rings to seal the lower section.

Various embodiments of the present invention can be adapted to receive circular cross-section catalysts, oval-shaped catalysts or other shapes. A water jacket is provided to extend around the exhaust manifold and a majority of the exhaust flow path. In a preferred embodiment of the present invention, the cooling jacket is supplied with water from the cylinder head cooling jacket and it then discharges the water into the cylinder block cooling circuit. It incorporates a generally series flow system which includes the head, manifold, and block. In order to avoid the accumulation of air pockets within the water cooling system, small passages and/or external paths are provided in strategic locations to bleed, or vent, air from the cooling circuits and also allow water to drain from the system when the engine is turned off. The water jacket, in a preferred embodiment of the present invention, is a multi-pass design. Water enters the manifold above the upper exhaust port of the engine, travels downwardly over the plurality of exhaust ports extending from the combustion chambers, then upwardly over the exhaust collecting conduit, and then downwardly over the catalyst housing. In certain alternative embodiments, it is possible to further include a bypass feature that can to be added to the exhaust manifold cooling circuit to independently regulate the temperature of the exhaust manifold, separate from the remaining parts of the cooling system. This could be used if it is determined that it is desirable to further increase the temperature of the exhaust manifold to assist catalytic conversion if the temperature of the exhaust gas is determined to be too low to achieve proper is catalyst operation.

Figure 1:
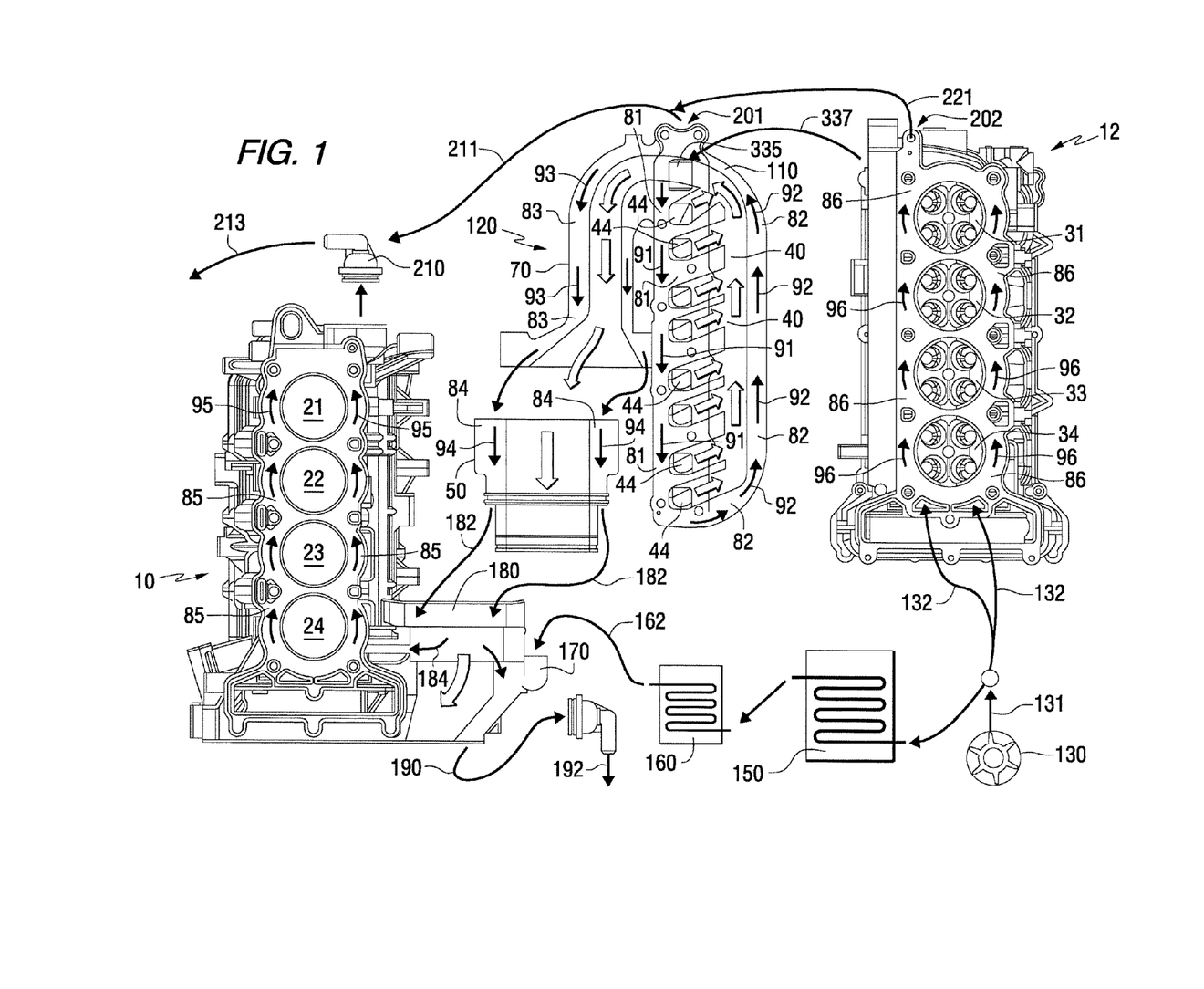
FIG. 1 is a highly schematic representation of an engine exhaust and cooling system with the depiction of the directions of flow of exhaust gas and liquid coolant.
Figure 2:
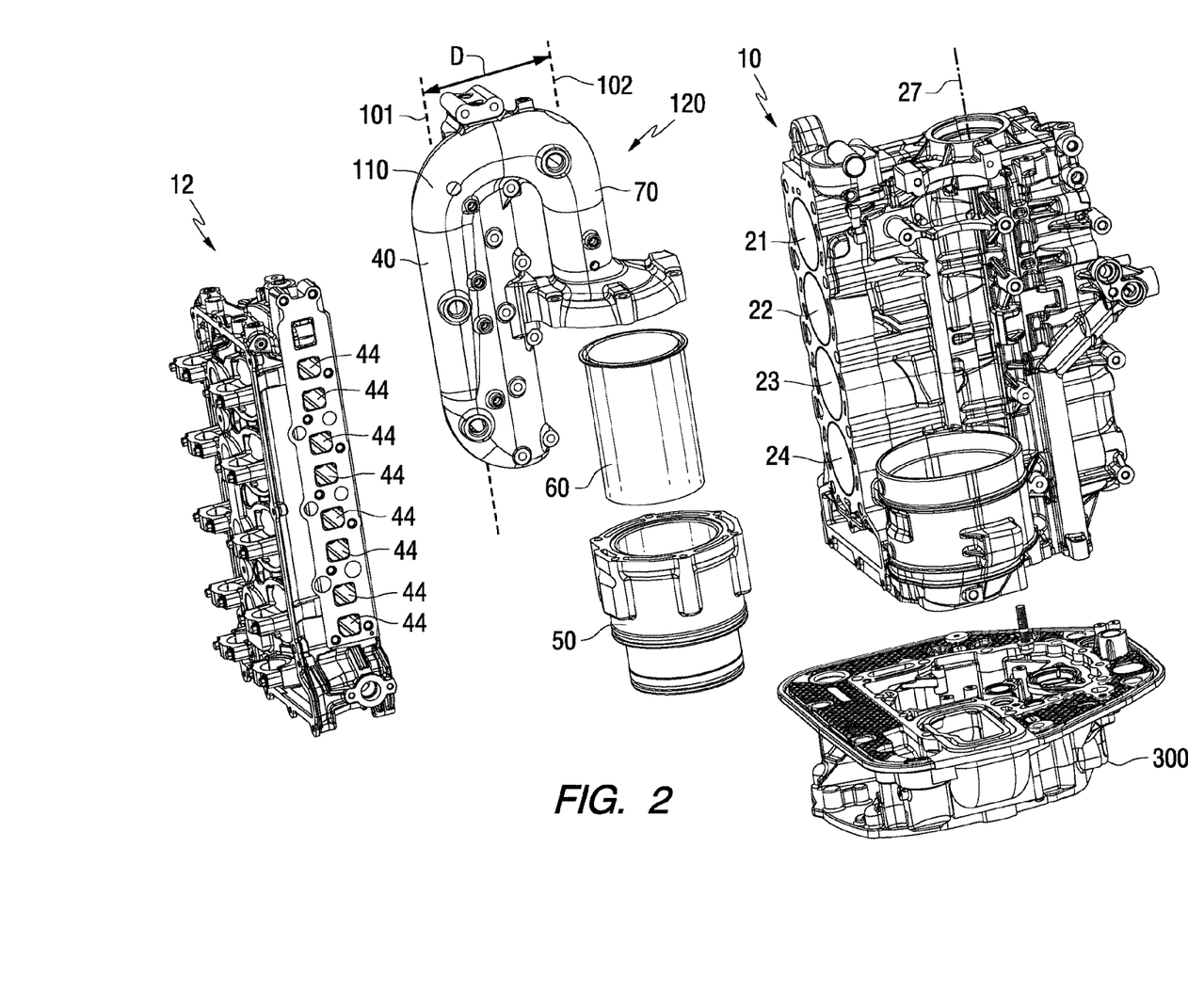
FIG. 2 is an exploded isometric representation of the components illustrated in FIG. 1, but from a generally opposite direction of view.

In order to understand the operation of preferred embodiments of the present invention, it is important to understand the individual components of the catalyzed engine system and the way in which those individual components cooperatively interact in order to advantageously affect the flow of exhaust gas and coolant. FIG. 1 is a highly schematic representation of a catalyzed engine system and FIG. 2 is an exploded isometric view of some of those same components, but with more detail shown to illustrate the separations between flow passages. In contradistinction to FIG. 2, FIG. 1 uses simplified lines to illustrate the separation between exhaust flow streams and coolant flow without illustrating the actual thicknesses of some of those flow separation elements. In other words, FIG. 1 is highly schematic and provided for the primary purpose of illustrating the directions and interconnections of various exhaust and water flow streams, whereas FIG. 2 more realistically shows the shapes and sizes of various elements and surfaces. FIGS. 1 and 2 will be described simultaneously in order to more clearly explain the fluid flows through the various components of the catalyzed engine system.

With reference to FIGS. 1 and 2, a marine propulsion device made in accordance with a preferred embodiment of the present invention comprises an engine which, in turn, comprises cylinder block 10 and a head 12. A plurality of cylinders, 21-24, is formed within the cylinder block 10. Reference numeral 27 identifies the axis of rotation of the engine crankshaft. A plurality of combustion chambers, 31-34, is formed within the head 12. Each of the combustion chambers, 31-34, is disposed adjacent to an associated one of the plurality of cylinders, 21-24. A preferred embodiment of the present invention also comprises an exhaust manifold 40. Exhaust conduits 44 are connected in fluid communication between the plurality of combustion chambers, 31-34, and the exhaust manifold 40 in order to direct the flow of exhaust gas, represented by block arrows in FIG. 1, from the plurality of combustion chambers to the exhaust manifold 40. In FIG. 1, eight exhaust conduits 44 are shown, with two exhaust conduits being associated with each of the individual combustion chambers, 31-34.

With continued reference to FIGS. 1 and 2, a catalyst housing 50 is configured to support, and direct the flow of exhaust gas through, a catalyst device 60. An exhaust passage 70 is connected in fluid communication between the exhaust manifold 40 and the catalyst housing 50. Several channels, which will be described in greater detail below, are configured to direct coolant in thermal communication with various portions of the exhaust system. A first channel 81 is configured to direct coolant to flow in thermal communication with the plurality of exhaust conduits 44. Arrows 91 illustrate the flow of coolant through the first channel 81. At the bottom of the first channel 81, the coolant is directed to reverse directions and flow upwardly into and through a second channel 82. Arrows 92 illustrate this flow of coolant through the second channel 82. The second channel 82 is configured to direct the coolant upwardly and in thermal communication with the exhaust manifold 40. A third channel 83 is configured to direct the coolant downwardly and in thermal communication with the exhaust passage 70. This flow is represented by arrows 93. A fourth channel 84 is disposed in thermal communication with the catalyst housing 50. Arrows 94 represent the direction of flow of coolant through the fourth channel 84.

With continued reference to FIGS. 1 and 2, a first vertical centerline 101 of the exhaust manifold 40 is shown displaced, by arrow D, from a second vertical centerline 102 of the catalyst device 60. The second vertical centerline 102 is illustrated in FIG. 2 generally aligned with the center of the exhaust passage 70. In certain embodiments of the present invention, the centerline of the catalyst is device 60 can be slightly offset from the centerline of the exhaust passage 70 because of packaging convenience. However, this occasional nonalignment between the centerline of the exhaust passage 70 and the centerline of the catalyst device 60 is not dimensionally critical. It is used to illustrate the concept that the catalyst 60 is occasionally offset from the exhaust manifold 40. This offset is sometimes provided so that the flow through the U-shaped portion 110 of the exhaust conducting structure 120 can be shaped to facilitate the maintenance of a generally uniform exhaust gas flow through the exhaust conducting structure 120. This uniform flow is maintained so that the exhaust gas is distributed across the catalyst device 60 so that the device is more efficiently utilized than would be the case if more stratified flow is allowed to create inefficient pockets, or eddies, as the exhaust gas passes downwardly through the catalyst device 60. It should be understood that not all arrangements allow perfect uniform flow through the exhaust conducting structure 120 as the exhaust passes from the exhaust manifold 40 to the catalyst device 60. However, it is believed that the displacement D of the catalyst device 60 from the exhaust manifold 40 allows for the provision of a U-shaped bend 110 having a larger radius of curvature than would otherwise be possible. Therefore, increasing dimension D, between vertical centerlines 101 and 102, facilitates the provision of a more gradual turning of the exhaust gas from an upward direction to a downward direction within the U-shaped portion 110 of the exhaust conducting structure 120.

With continued reference to FIGS. 1 and 2, it should be understood that most applications of preferred embodiments of the present invention utilize water as the coolant flowing through the channels, 81-84, described above. In those applications, a water pump 130 is configured to draw water from a body of water in which the marine propulsion device is operated and direct the water, as represented by arrow 131, to the cylinder head 12 as represented by arrows 132. The pump 130 can also direct water to a charge air cooler 150 and an oil cooler 160 in certain applications of the present invention. Some of the water is conducted, as represented by arrow 162, from the oil cooler 160 to a circuit which includes a poppet valve 170.

With continued reference to FIGS. 1 and 2, water is also directed from the catalyst housing 50 to an annular region 180, as represented by arrows 182. Some of this water flows into the block 10, as represented by arrow 184, and some of this water flows to the poppet valve 170 through a leak passage and out of the system, as represented by arrow 190 and arrow 192. A first vent opening 201 is provided at the top portion of the third channel 83, near the intersection between the second and third channels, 82 and 83, in order to connect these channels with ambient pressure and allow the venting of air that may have collected within the water streams represented by arrows 92 and 93. This escaping air and coolant is connected to the thermostat 210 as represented by arrow 211 in FIG. 1. A fifth channel 85 is configured to direct coolant upwardly within the cylinder block 10 and in thermal communication with the plurality of cylinders, 21-24. This water is supplied in the manner described above and illustrated by arrows 182 and 184. A sixth channel 86 is configured to direct the water upwardly from the pump 130 and in thermal communication with the plurality of combustion chambers, 31-34. A second vent opening 202 is connected with the sixth channel 86 and with ambient pressure to direct air leakage, as illustrated by arrow 221, to the thermostat 210. As can be seen in FIGS. 1 and 2, the exhaust manifold 40 is configured to direct the flow of exhaust gas, as represented by block arrows, upwardly and then into the exhaust passage 70 through the U-shaped connection 110. The exhaust passage 70 is configured to then direct the flow of exhaust gas, represented by block arrows, downwardly into the catalyst housing 50.

With continued reference to FIGS. 1 and 2, in a preferred embodiment of the present invention, an exhaust conducting structure 120 is shaped to define the plurality of exhaust conduits 44, the exhaust manifold 40, and the exhaust passage 70. In the preferred embodiment of the present invention, the exhaust conducting structure 120 is cast as a single member which is removably attachable to the head 12 and to the catalyst housing 50.

Figure 3:
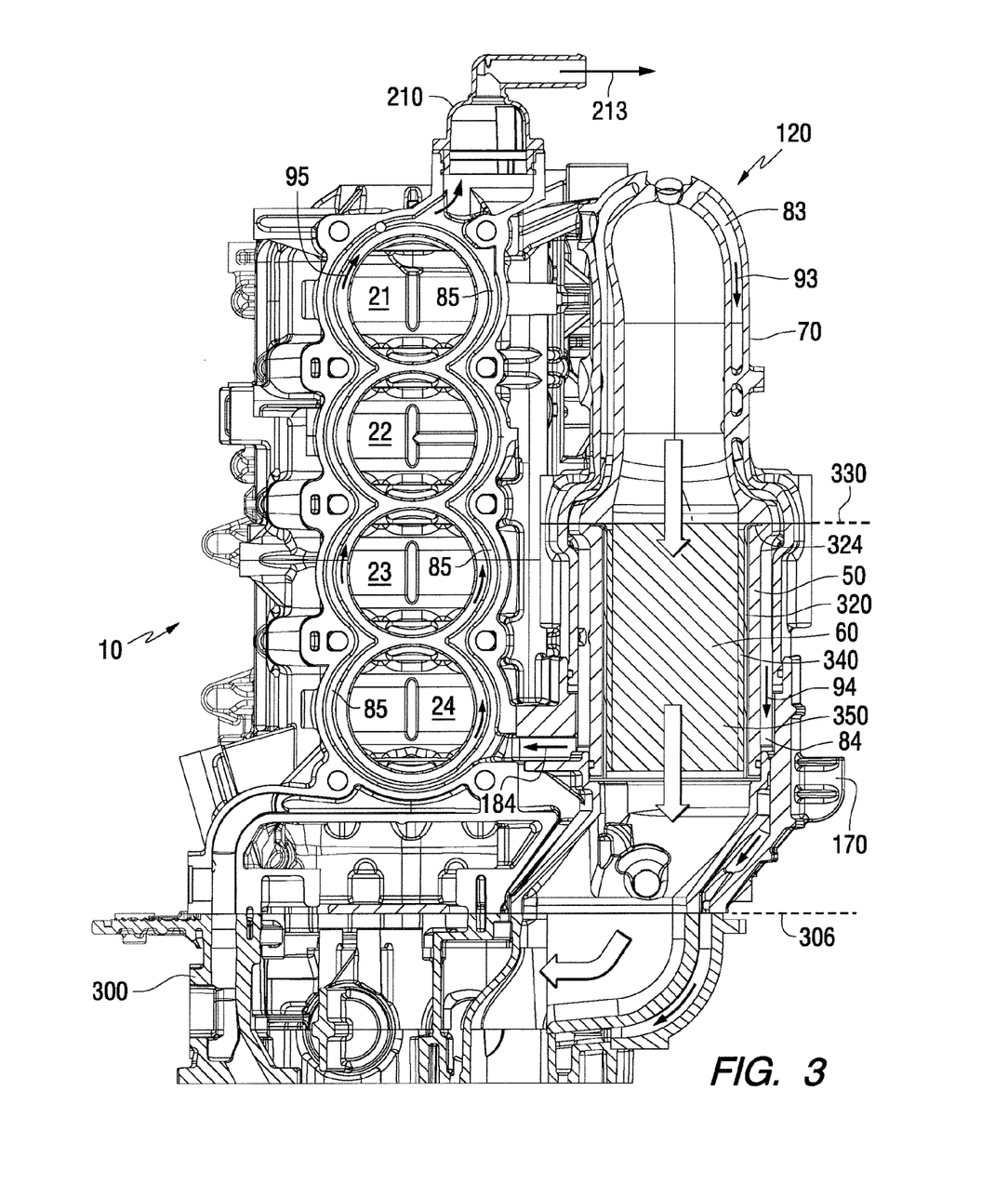
FIG. 3 is a section view of an outboard motor engine taken through its cylinders and catalyst device.
Figure 4:
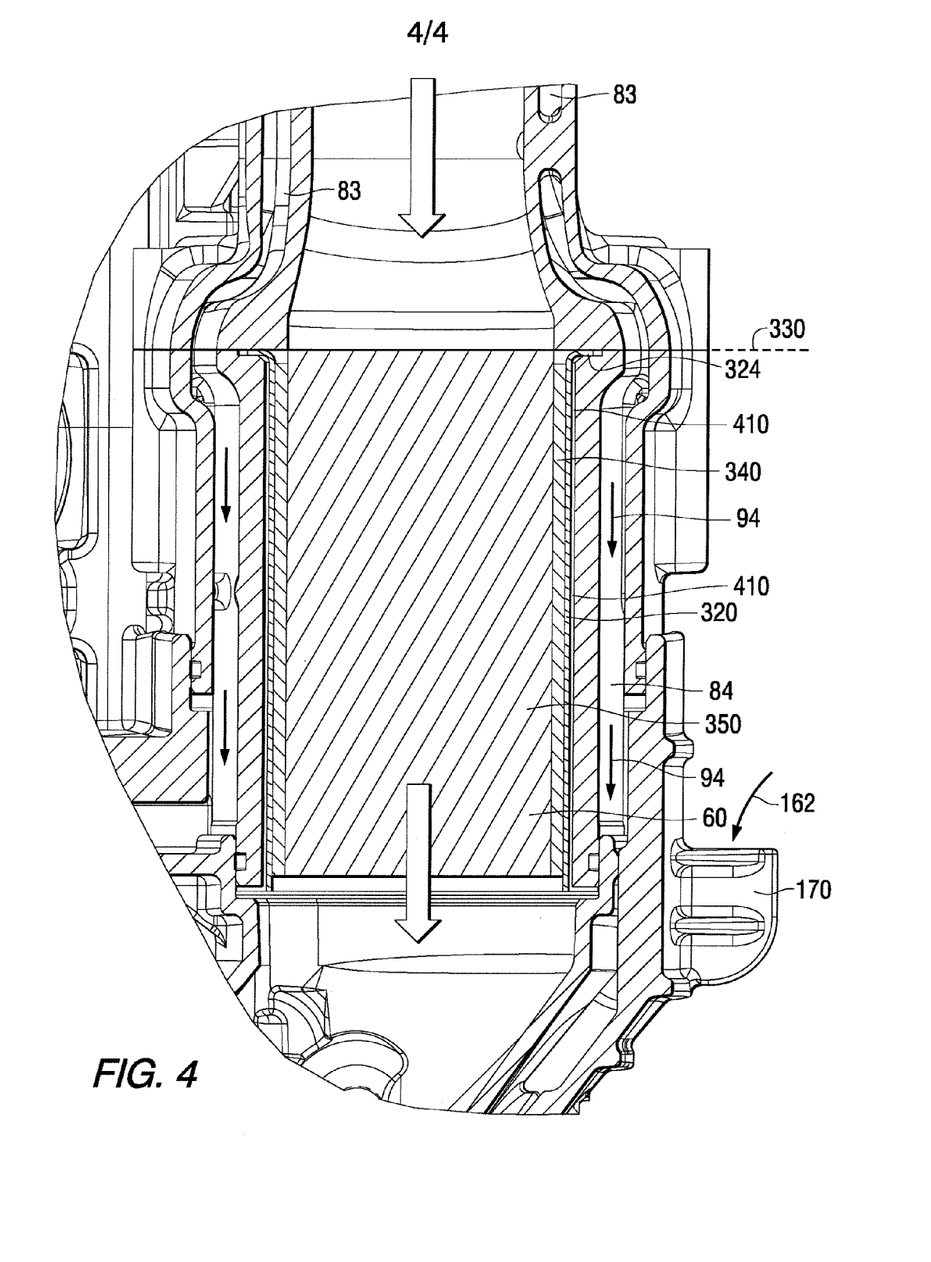
FIG. 4 is an enlarged section view of the catalyst device shown in FIG. 3.

FIG. 3 is a section view of the engine block 10 taken at a plane which provides a section view of the exhaust conducting structure 120, the catalyst housing 50 and the catalyst device 60. In addition, the cylinders, 21-24, are shown. An adapter plate 300 is shown below parting line 306. The adapter plate is configured to support the engine and provide passages for exhaust gas and coolant. As can be seen in FIG. 3, the catalyst device 60 is located above the adapter plate 300. This is facilitated by the shape of the exhaust conducting structure 120 which directs the exhaust gas in an upward direction after it flows out of the combustion chambers, 31-34, and then downwardly into the catalyst device 60. This length of upward flow of exhaust gas, through the exhaust manifold 40, creates sufficient space to accommodate the catalyst housing 50 above the parting line 306. It also significantly facilitates the removal of the catalyst device 60 without having to completely dismantle either the engine or, if the catalyst is located below the adapter plate 300, the driveshaft housing. The combined shapes and sizes of the exhaust manifold 40, exhaust passage 70, and catalyst housing 50 allow the exhaust conducting structure 120 to be disconnected from the head 12 and block 10 to allow the removal of the catalyst device 60 with relatively little disruption to the other components of the engine. The displacement D described above also allows the exhaust gases to flow in a generally uniform manner and be distributed across the catalyst device 60.

In a particularly preferred embodiment of the present invention, the catalyst device contains a substrate that comprises a large number of small parallel passages that run along its length in a direction generally parallel to the direction of flow of the exhaust gas. The substrate material in a preferred embodiment of the present invention is a ceramic, such as Cordierite. It acts as a carrier for a wash coat that contains catalytic materials, such as Palladium, Platinum, and Rhodium. An outer housing, or can 320, surrounds the substrate. The can 320 is shown in FIG. 3 and also in the enlarged view of FIG. 4. With reference to FIGS. 1-4, and particularly to FIGS. 3 and 4, it can be seen that the can 320 has a flange 324 at its upper end. The flange 324 is shaped to be trapped by a design feature of the exhaust conducting structure 120 at parting plane 330. A fibrous mat material 340 is compressed in the annual space between the can 320 and the substrate 350. The fibrous mat material 340 provides support for the substrate 350.

With continued reference to FIGS. 1-4, numerous advantageous features of the present invention can be seen. It should be understood that many of these features cooperate with each other to provide beneficial advantage for a catalyzed exhaust system and, without this beneficial cooperation, certain advantages of the preferred embodiments of the present invention would not be achieved. As an example, the exhaust conducting structure 120 conveniently and efficiently defines the plurality of exhaust conduit 44, the exhaust manifold 40, and the exhaust passage 70 in such a way that it initially directs the exhaust gas to flow upwardly before turning downwardly. This reversal of direction creates space for the catalyst housing 50 so that the catalyst device 60 can be located above the parting line 306 between the engine and the adapter plate 300 and, as a result, be kept above the driveshaft housing of the outboard motor. This simplifies removal and replacement of the catalyst device 60. In addition, the displacement D allows this upward and downward direction of exhaust gas to be accomplished in a way that does not create disruptive stratified flow of exhaust gas that could otherwise result if the 180 degree reversal of direction was done without the provision of a sufficiently large radius of curvature within the U-shaped upper portion of the exhaust conducting structure 120. Stratification can deleteriously affect the efficiency and effectiveness of the catalyst and result in worse emission characteristics of the exhaust gas. Another important and advantageous feature of the present invention, in its preferred embodiments, is the fact that the water flow is reversed several times in order to provide thermally advantageous communication between the water and certain heat emitting components. As an example, the water is caused to flow upwardly through both the block 10 and head 12 to assure that the fifth and sixth channels remain filled during the majority of the engine's operating time. This occurs because both the fifth and sixth channels are filled from the bottom. In order to accomplish this function without creating air pockets within these channels, the second vent opening 202 is provided at the upper portion of the head 12 and the thermostat 210 is located at the upper portion of the block 10 to provide its discharge 213 at a location that evacuates the air that could otherwise be trapped within the fifth channel 85. Furthermore, the first vent opening 201 is provided at the upper portion of the second and third channels, 82 and 83, to perform this same function with regard to bleeding air that could otherwise be trapped within the second and third channels, 82 and 83. It should also be noted that the water is introduced into the first channel 81 at an opening 335 as represented by arrow 337, which forces the water to flow downwardly toward the bottom portion of the first and second channels, 81 and 82, so that the second channel remains filled surrounding the exhaust manifold 40 with any trapped air being removed by the first vent opening 201 toward the thermostat 210 as represented by arrow 211. In the illustrated embodiment shown in FIGS. 1 and 2, the water flows initially downwardly through the first channel 81 as represented by arrows 91, then upwardly through the second channel 82 as represented by arrows 92. After reaching the upper portion of the exhaust conducting structure is 120, and having the air bled through the first vent opening 201, the water is then again turned downwardly through the third channel 83 as shown by arrows 93 to flow out of the exhaust passage 70 into the catalyst housing 50. In order to prevent this water from lowering the temperature of the catalyst device 60 below an appropriate magnitude, an annular air gap 410 is provided surrounding the can 320. This is most clearly illustrated in FIG. 4. This annular air space 410 provides insulation between the relatively hot catalyst device 60, which is operating at or above exhaust gas temperatures, and the cooler catalyst housing 50 that is subject to the temperature reducing effects of the water flowing through the fourth channel 84 as represented by arrows 94. The exhaust gas initially flows from the combustion chambers, 31-34, through the exhaust conduits 44 in a generally horizontal direction before being turned upwardly to flow through the exhaust manifold 40. This is most clearly illustrated in FIG. 1. The exhaust manifold 40 directs this gas flow toward the top portion of the exhaust conducting structure 120 before being turned downwardly by the exhaust passage 70 which continues to direct the exhaust gas downwardly through the catalyst housing 50, and its supported catalyst device 60, and downwardly through the adapter plate 300, the driveshaft housing (not shown in the figures) of the outboard motor, and the hub of its propeller.

With continued reference to FIGS. 1-4, it should be understood that the repeated reversals of coolant flow directions and the related reversals of exhaust gas flow directions are beneficially interrelated in a manner that results in several significant advantages. With continued reference to FIGS. 1-4, the exhaust gas flow, which is initially in an upward direction, is provided to create vertical space between the exhaust manifold 40 and the adapter plate 300 so that the catalyst device 60 can be located below the exhaust manifold 40 and above the driveshaft housing. This is significantly different from the many known types of outboard motor catalyst arrangements. It facilitates the access to the catalyst device 60 through the relatively easy removal of the exhaust conducting structure 120 by unbolting it from the head 12 and the catalyst housing 50 which, in turn, is bolted to the block 10. It can then be lifted upwardly and away from the head 12 to allow access to the catalyst device 60 located within, and supported by, the catalyst housing 50. The provision of the displacement D between the centerlines, 101 and 102, facilitates this removal and also provides uniform flow for the exhaust gas flowing through the catalyst device 60 which would not likely be possible without the larger radius of curvature provided by the U-shaped portion 110. Even when the centerline of the catalyst device 60 is offset from the second centerline 102, the flow through the catalyst device 60 is generally uniform and well distributed through the conductive passageways that direct exhaust gas vertically downwardly through the catalyst device 60. The arrangement of coolant channels also provides the beneficial upward filling of the fifth and sixth channels, 85 and 86, within the block 10 and head 12 of the engine. This, in turn, is further facilitated by the location of the thermostat 210 at the upper portion of the fifth channel to remove potential trapped air pockets at the upper portion of the fifth channel and the vent opening 202 at the upper portion of the sixth channel 86 for this same purpose. It should be noted that the downward direction of flow 93 through the third channel 83 and the associated downward flow 94 through the fourth channel 84 provide for the filling of the fifth channel 85 at its bottom portion as represented by arrow 184. Similarly, the pump 130 is connected to the bottom portion of the head 12 to fill the sixth channel 86 in this same way in cooperation with the second vent opening 202.

With continued reference to FIGS. 1-4, it can also be seen that the location of the catalyst device 60 above the adaptor plate 300 would not otherwise be facilitated if the exhaust gas was directed downwardly from the combustion chambers, 31-34, in a conventional manner which would provide the shortest path for the exhaust gas through the adapter plate 300, the driveshaft housing (not shown in the figures), and the hub of the propeller (not shown in the figures).

Although the preferred embodiment of the present invention is described with particular specificity with respect to one of its preferred embodiments, it should be understood that alternative embodiments are also within its scope.

We claim:

1. A marine propulsion device, comprising:
   an engine comprising a cylinder block and a head;
   a plurality of cylinders defined by said cylinder block;
   a plurality of combustion chambers defined by said head, each of said combustion chambers being disposed proximate an associated one of said plurality of cylinders;
   an exhaust manifold;
   a plurality of exhaust conduits connected in fluid communication between said plurality of combustion chambers and said exhaust manifold to direct a flow of exhaust gas from said plurality of combustion chambers to said exhaust manifold;
   a catalyst housing to direct said flow of exhaust gas through a catalyst device;
   an exhaust passage connected in fluid communication between said exhaust manifold and said catalyst housing;
   a first channel to direct a coolant to flow in thermal communication with said plurality of exhaust conduits;
   a second channel to direct said coolant upwardly and in thermal communication with said exhaust manifold;
   a third channel to direct said coolant downwardly and in thermal communication with said exhaust passage; and
   a fourth channel connected in thermal communication with said catalyst housing.

2. The marine propulsion device of claim 1, wherein:
   a first vertical centerline of said exhaust manifold is separated from a second vertical centerline of said catalyst device by greater than 1.3 times the diameter of said catalyst device.

3. The marine propulsion device of claim 1, wherein:
   a first vertical centerline of said exhaust manifold is separated from a second vertical centerline of said catalyst device by between 1.3 and 1.5 times the diameter of said catalyst device.

4. The marine propulsion device of claim 1, further comprising:
   a first vent opening connecting said third channel in fluid communication with ambient pressure.

5. The marine propulsion device of claim 1, further comprising:
   a fifth channel to direct said coolant upwardly within said cylinder block and in thermal communication with said plurality of cylinders.

6. The marine propulsion device of claim 1, wherein:
   said coolant is water.

7. The marine propulsion device of claim 6, further comprising:
   a pump for drawing said water from a body of water.

8. The marine propulsion device of claim 7, further comprising:
   a sixth channel to direct said water upwardly from said pump and in thermal communication with said plurality of combustion chambers.

9. The marine propulsion device of claim 8, further comprising:
   a second vent opening connecting said sixth channel in fluid communication with ambient pressure.

10. The marine propulsion device of claim 1, wherein:
    said exhaust manifold is to direct said flow of exhaust gas upwardly into said exhaust passage.

11. The marine propulsion device of claim 1, wherein:
    said exhaust passage is to direct said flow of exhaust gas downwardly into said catalyst housing.

12. The marine propulsion device of claim 1, further comprising:
    an exhaust conducting structure which defines said plurality of exhaust conduits, said exhaust manifold, and said exhaust passage.

13. The marine propulsion device of claim 12, wherein:
    said exhaust conducting structure is a cast member which is removably attachable to said head and to said catalyst housing.

14. A marine propulsion device, comprising:
    an engine comprising a cylinder block and a head;
    a plurality of cylinders defined by said cylinder block;
    a plurality of combustion chambers defined by said head, each of said combustion chambers being disposed proximate an associated one of said plurality of cylinders;

an exhaust manifold;
a plurality of exhaust conduits connected in fluid communication between said plurality of combustion chambers and said exhaust manifold to direct a flow of exhaust gas from said plurality of combustion chambers to said exhaust manifold;
a catalyst housing directing said flow of exhaust gas through a catalyst device;
an exhaust passage connected in fluid communication between said exhaust manifold and said catalyst housing;
an exhaust conducting structure defining said plurality of exhaust conduits, said exhaust manifold, and said exhaust passage;
a pump for drawing water from a body of water;
a first channel directing said water to flow in thermal communication with said plurality of exhaust conduits;
a second channel directing said water in thermal communication with said exhaust manifold;
a third channel directing said water in thermal communication with said exhaust passage;
a fourth channel connected in thermal communication with said catalyst housing;
a fifth channel directing said water within said cylinder block and in thermal communication with said plurality of cylinders; and
a sixth channel directing said water from said pump and in thermal communication with said plurality of combustion chambers.

15. The marine propulsion device of claim 14, further comprising:
a first vent opening connecting said third channel in fluid communication with ambient pressure; and
a second vent opening connecting said sixth channel in fluid communication with ambient pressure.

16. The marine propulsion device of claim 14, wherein:
said second channel directs said coolant upwardly within said exhaust manifold;
said third channel directs said coolant downwardly within said exhaust passage;
said fifth channel directs said coolant upwardly within said cylinder block;
said sixth channel directs said water upwardly from said pump and in thermal communication with said plurality of combustion chambers;
said exhaust manifold directs said flow of exhaust gas upwardly into said exhaust passage; and
said exhaust passage directs said flow of exhaust gas downwardly into said catalyst housing.

17. The marine propulsion device of claim 14, wherein:
a first vertical centerline of said exhaust manifold is spaced from a second vertical centerline of said catalyst device by greater than 1.5 times the diameter of said catalyst device.

18. The marine propulsion device of claim 14, wherein:
said exhaust conducting structure is a cast member which is removably attachable to said head and to said catalyst housing.

19. A marine propulsion device, comprising:
an engine comprising a cylinder block and a head;
a plurality of cylinders defined by said cylinder block;
a plurality of combustion chambers defined by said head, each of said combustion chambers being disposed proximate an associated one of said plurality of cylinders;
an exhaust manifold;
a plurality of exhaust conduits connected in fluid communication between said plurality of combustion chambers and said exhaust manifold to direct a flow of exhaust gas from said plurality of combustion chambers to said exhaust manifold;
a catalyst housing directing said flow of exhaust gas through a catalyst device;
an exhaust passage connected in fluid communication between said exhaust manifold and said catalyst housing, said exhaust manifold directing said flow of exhaust gas upwardly into said exhaust passage, said exhaust passage directing said flow of exhaust gas downwardly into said catalyst housing;
a pump drawing water from a body of water;
a first channel directing said water to flow in thermal communication with said plurality of exhaust conduits;
a second channel directing said water upwardly and in thermal communication with said exhaust manifold;
a third channel directing said water downwardly and in thermal communication with said exhaust passage;
a fourth channel connected in thermal communication with said catalyst housing;
a fifth channel directing said water upwardly within said cylinder block and in thermal communication with said plurality of cylinders;
a sixth channel directing said water upwardly from said pump and in thermal communication with said plurality of combustion chambers; and
an exhaust conducting structure defining said plurality of exhaust conduits, said exhaust manifold, and said exhaust passage.

20. The marine propulsion device of claim 19, further comprising:
a first vent opening connecting said third channel in fluid communication with ambient pressure; and
a second vent opening connecting said sixth channel in fluid communication with ambient pressure, said exhaust conducting structure being a cast member which is removably attachable to said head and to said catalyst housing, a first vertical centerline of said exhaust manifold being separated from a second vertical centerline of said catalyst device by greater than 1.4 times the diameter of said catalyst device.

* * * * *